United States Patent
Ohnemus et al.

(10) Patent No.: US 8,801,563 B2
(45) Date of Patent: Aug. 12, 2014

(54) 9-SPEED PLANETARY-GEAR AUTOMATIC TRANSMISSION

(71) Applicant: Bayerische Motoren Werke Aktiengesellschaft, Munich (DE)

(72) Inventors: Ulrich Ohnemus, Hattenhofen (DE);
Tilo Marschall, Munich (DE);
Alexander Martin, Munich (DE);
Lothar Wolf, Holzkirchen (DE);
Andreas Senft, Starnberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/888,531

(22) Filed: May 7, 2013

(65) Prior Publication Data
US 2013/0252780 A1 Sep. 26, 2013

Related U.S. Application Data

(63) Continuation of application No. PCT/EP2011/005296, filed on Oct. 20, 2011.

(30) Foreign Application Priority Data

Nov. 19, 2010 (DE) .................. 10 2010 052 001

(51) Int. Cl.
*F16H 37/06* (2006.01)
*F16H 3/62* (2006.01)
*F16H 3/44* (2006.01)

(52) U.S. Cl.
USPC ........... 475/275; 475/330; 475/277; 475/288; 475/311

(58) Field of Classification Search
CPC ............... F16H 2200/0065; F16H 2200/2012; F16H 2200/2046; F16H 2200/2097

USPC ................ 475/275–292, 311–313, 317–319, 475/323–325, 329, 330

See application file for complete search history.

(56) References Cited

U.S. PATENT DOCUMENTS

| | | | |
|---|---|---|---|
| 7,226,381 B2* | 6/2007 | Klemen | 475/275 |
| 7,985,159 B2* | 7/2011 | Phillips et al. | 475/284 |
| 7,998,013 B2* | 8/2011 | Phillips et al. | 475/276 |
| 8,210,983 B2* | 7/2012 | Gumpoltsberger et al. | 475/284 |
| 8,231,501 B2* | 7/2012 | Gumpoltsberger et al. | 475/284 |
| 8,251,859 B2* | 8/2012 | Gumpoltsberger et al. | 475/284 |
| 8,328,678 B2* | 12/2012 | Seo et al. | 475/271 |
| 8,425,370 B2 | 4/2013 | Leesch et al. | |
| 2009/0011891 A1* | 1/2009 | Phillips et al. | 475/275 |
| 2009/0197734 A1 | 8/2009 | Phillips et al. | |
| 2009/0209387 A1 | 8/2009 | Phillips et al. | |
| 2010/0210400 A1 | 8/2010 | Phillips et al. | |
| 2010/0210401 A1 | 8/2010 | Phillips et al. | |

FOREIGN PATENT DOCUMENTS

DE 10 2008 0550 626 A1 5/2010

OTHER PUBLICATIONS

Corresponding International Search Report with English Translation dated Jan. 31, 2012 (six (6) pages).
German Examination Report with partial English Translation dated Mar. 17, 2011 (seven (7) pages).

* cited by examiner

*Primary Examiner* — Tisha Lewis
(74) *Attorney, Agent, or Firm* — Crowell & Moring LLP

(57) ABSTRACT

A 9-speed planetary gear-automatic transmission includes precisely one gearbox input element, precisely one gearbox output element, precisely four planetary gear sets and precisely six shifting devices for selecting the individual gears of the planetary gear-automatic transmission.

22 Claims, 2 Drawing Sheets

| Gang | i Gang | φ_Gang | φ_Gesamt |
|---|---|---|---|
| R | -4,194 | | |
| 1 | 5,377 | | 8,962 |
| 2 | 3,177 | 1,692 | |
| 3 | 2,371 | 1,340 | |
| 4 | 1,461 | 1,623 | |
| 5 | 1,131 | 1,292 | |
| 6 | 1,000 | 1,131 | |
| 7 | 0,822 | 1,217 | |
| 8 | 0,715 | 1,150 | |
| 9 | 0,600 | 1,192 | |

Fig 2

| Gang | B03 | B06 | K14 | K18 | K38 | K78 |
|---|---|---|---|---|---|---|
| R | ● | | | ● | | ● |
| 1 | | | ● | ● | | ● |
| 2 | | ● | ● | | | ● |
| 3 | | | ● | | ● | ● |
| 4 | ● | | ● | | ● | |
| 5 | | ● | ● | | ● | |
| 6 | | | ● | ● | ● | |
| 7 | | ● | ● | ● | | |
| 8 | | ● | | ● | ● | |
| 9 | ● | ● | | ● | | |

Fig 3

9-SPEED PLANETARY-GEAR AUTOMATIC TRANSMISSION

CROSS REFERENCE TO RELATED APPLICATIONS

This application is a continuation of PCT International Application No. PCT/EP2011/005296, filed Oct. 20, 2011, which claims priority under 35 U.S.C. §119 from German Patent Application No. 10 2010 052 001.2, filed Nov. 19, 2010, the entire disclosures of which are herein expressly incorporated by reference.

BACKGROUND AND SUMMARY OF THE INVENTION

The present invention relates to a planetary gear-automatic transmission.

The object of the invention is to provide a planetary gear-automatic transmission that has more forward speed gears than the 8-speed automatic transmission that is currently already on the market and, moreover, a planetary gear-automatic transmission that exhibits a structural design that is as simple as possible.

This and other objects are achieved according to the invention by a planetary gear-automatic transmission, in particular, a planetary gear-automatic transmission with nine forward speed gears. In this case, the planetary gear-automatic transmission has precisely four planetary gear sets and precisely six shifting elements that are provided for shifting the individual speed gears of the planetary gear-automatic transmission.

Some or all of these shifting elements can be non-positive locking or positive locking shifting elements, such as disk clutches, disk brakes or claw clutches.

To the extent that one or more positive locking shifting elements are provided, individual positive locking shifting elements, or each of the positive locking shifting elements, can be assigned a synchronizing unit.

The planetary gear-automatic transmission has a transmission input, which is formed, for example, by way of a transmission input shaft, and a transmission output, which can be formed by way of a transmission output shaft. A "starter module" can be superposed on the planetary gear-automatic transmission; and this starter module can be formed, for example, by way of a hydrodynamic torque converter. Thus, the transmission input can be connected to the "output" of a hydrodynamic torque converter.

The transmission output can be coupled with a drive train of a motor vehicle. In the case of an all-wheel drive vehicle, the transmission output can be connected, for example, to an input of the all-wheel distributor transmission.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a table for the purpose of explaining the transmission spread that can be obtained with the transmission shown in FIG. 1; and FIG. 3 shows a shifting matrix for the purpose of explaining which shifting elements are closed in certain speed gears.

DETAILED DESCRIPTION OF THE DRAWINGS

Figure 1:
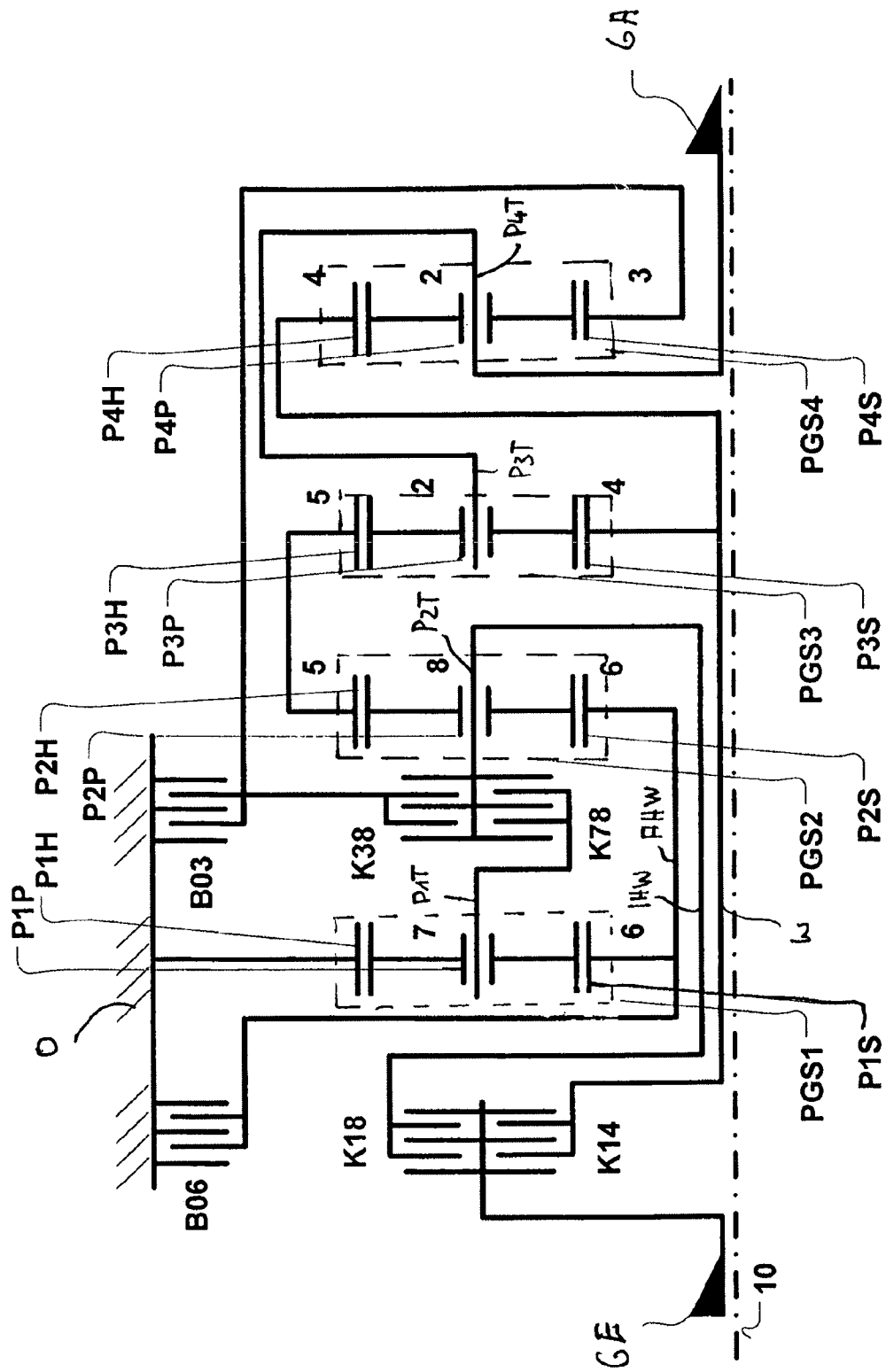
FIG. 1 shows an exemplary embodiment of a planetary gear-automatic transmission according to the invention.

The planetary gear-automatic transmission, shown in FIG. 1, includes a transmission input shaft GE and a transmission output shaft GA.

Furthermore, precisely four planetary gear sets are provided; and, in particular, when viewed from the transmission input GE in the direction of the transmission output GA, a first planetary gear set PGS1, a second planetary gear set PGS2, a third planetary gear set PGS3 and a fourth planetary gear set PGS4 are provided.

Furthermore, precisely six shifting elements are provided for shifting the individual speed gears of the planetary-gear automatic transmission: i.e., a first clutch K78, a second clutch K18, a third clutch K14, a fourth clutch K38, a first brake B06 and a second brake B03.

The first planetary gear set PGS1 includes a first hollow wheel P1H, which is securely connected to a housing O, as well as a first sun wheel P1S, which is arranged in such a way that it can be rotated, and first planetary wheels, which mesh with the first hollow wheel P1H and the first sun wheel P1S. Of these first planetary wheels, only a first planetary wheel P1P is depicted in the drawing shown in FIG. 1. The first planetary wheels P1P are mounted in a rotatable manner on a first planetary carrier P1T.

Furthermore, a first brake B06 is provided. When the first brake B06 is in the closed state, the first sun wheel P1S is securely fixed in relation to the housing O.

The second planetary gear set PGS2 of the planetary-gear automatic transmission shown in FIG. 1 includes a hollow wheel P2H, which is arranged in a rotatable manner, a second sun wheel P2S, which is arranged in a rotatable manner, and second planetary wheels P2P, which mesh with the second hollow wheel P2H and the second sun wheel P2S. These second planetary wheels are mounted in a rotatable manner on a second planetary wheel carrier P2T.

It is very clear from FIG. 1 that the first sun wheel P1S is permanently coupled in rotation with the second sun wheel P2S. As a result, both sun wheels P1S, P2S always rotate at one and the same rotational speed.

Furthermore, the planetary-gear automatic transmission from FIG. 1 includes a first clutch K78. When the first clutch K78 is in the closed state, the first planetary wheel carrier P1T is coupled in rotation with the second planetary wheel carrier P2T. Hence, when the first clutch K78 is closed, the two planetary wheel carriers P1T, P2T rotate at one and the same rotational speed.

As an alternative to the first clutch K78, a positive locking shifting element, such as a claw clutch, in particular, a claw clutch with a synchronizing unit, could also be used.

Furthermore, a second clutch K18 is provided. When the second clutch K18 is in the closed state, the transmission input element GE is coupled in rotation with the second planetary wheel carrier P2T.

The third planetary gear set PGS3 includes a third hollow wheel P3H, which is arranged in a rotatable manner, a third sun wheel P3S, which is arranged in a rotatable manner, and third planetary wheels, which mesh with the third hollow wheel P3H and the third sun wheel P3S. Of these third planetary wheels, only the third planetary wheel P3P is depicted in the drawing shown in FIG. 1. The third planetary wheels P3P are mounted in a rotatable manner on a third planetary wheel carrier P3T.

It is very clear from FIG. 1 that the third hollow wheel P3H is permanently coupled in rotation with the second hollow wheel P2H. As a result, the third planetary wheel carrier P3T in turn is permanently coupled in rotation with the transmission output element GA.

Furthermore, a third clutch K14 is provided. When the third clutch K14 is in the closed state, the third sun wheel P3S is coupled in rotation with the transmission input element GE.

The fourth planetary gear set PGS4 includes a fourth hollow wheel P4H, which is arranged in a rotatable manner, a fourth sun wheel P4S, which is arranged in a rotatable manner, and fourth planetary wheels P4P, which mesh with the fourth hollow wheel P4H and the fourth sun wheel P4S. The fourth planetary wheels are mounted in a rotatable manner on a fourth planetary wheel carrier P4T. The fourth hollow wheel P4H is permanently coupled in rotation with the third sun wheel P3S.

It is very clear from FIG. 1 that the fourth planetary wheel carrier P4T is permanently coupled in rotation with the transmission output element GA. Furthermore, it can be observed that the fourth planetary wheel carrier P4T is permanently coupled in rotation with the third planetary carrier P3T.

When the second brake B03 is closed, the fourth sun wheel P4S can be securely fixed in relation to the housing O.

Furthermore, the transmission, shown in FIG. 1, includes a fourth clutch K38. When the fourth clutch K38 is in the closed state, the second planetary wheel carrier P2T is coupled in rotation with the fourth sun wheel P4S.

Furthermore, the transmission shown in FIG. 1 is characterized by a hollow shaft arrangement, which includes an outer hollow shaft AHW, an inner hollow shaft IHW, which is arranged in a rotatable manner in the outer hollow shaft AHW, and a shaft W, which is arranged in a rotatable manner in the inner hollow shaft IHW. The first sun wheel P1S is coupled in rotation with the second sun wheel P2S by way of the outer hollow shaft AHW. The second planetary wheel carrier P2T is coupled in rotation with the output side of the second clutch K18 by way of the inner hollow shaft IHW. The third sun wheel P3S is connected to an output side of the third clutch K14 by way of the shaft W that is arranged in the inner hollow shaft IHW. The third clutch K14 can be, in particular, a positive locking clutch, such as a claw clutch.

FIG. 2 shows the gear ratios of the individual transmission gears. The planetary gear-automatic transmission shown in FIG. 1 has in total nine forward speed gears and a reverse speed gear.

In a specific exemplary embodiment, the gear spread lies, for example, in a range between 1.131 (spread between the fifth and sixth speed gear) and 1.692 (spread between the first and second speed gear). The total spread of the transmission has a relatively high value of 8.962.

FIG. 2 shows that the transmission has three so-called "over-drive gears," i.e. the forward speed gears 7, 8, 9.

By varying the "standing gear ratios" (the concept "standing gear ratio" is defined as the ratio between the teeth count of the hollow wheel and the teeth count of the sun wheel) $i_{0PGS1}$, $i_{0PGS2}$, $i_{0PGS3}$, it goes without saying that additional gear stage jumps can be achieved.

FIG. 3 shows the shift matrix of the planetary-gear automatic transmission, depicted in FIG. 1, for the individual speed gears. A black dot in a box of the table represents a closed shifting element (torque transmission possible). Empty boxes in the table represent an open shifting element (no torque transmission possible). For example, when the third speed gear is engaged, the two brakes B03, B06 are open; the clutch K14 is closed; the clutch K18 open; the clutch K38 closed; and the clutch K78 is also closed.

In the case of the transmission shown in FIG. 1, three shifting elements are always closed and three shifting elements are always open in each speed gear. Such an arrangement is advantageous with respect to the efficiency of the transmission, because practically no slip or drag losses occur at the closed shifting elements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A planetary gear-automatic transmission, comprising:
   a planetary gear-automatic transmission having nine forward speed gears, the planetary gear-automatic transmission, comprising:
   precisely one transmission input element;
   precisely one transmission output element;
   precisely four planetary gear sets; and
   precisely six shifting elements, each shifting element being provided for shifting individual speed gears of the nine forward speed gears of the planetary gear-automatic transmission, wherein
   when a first clutch is in a closed state, a first planetary wheel carrier and a second planetary wheel carrier are coupled in rotation with each other, and
   a first planetary gear set comprises a first hollow wheel, which is securely connected to a housing of the planetary gear-automatic transmission; a first sun wheel, which is arranged in a rotatable manner; and first planetary wheels, which mesh with the first hollow wheel and the first sun wheel; the first planetary wheels being mounted in a rotatable manner on the first planetary wheel carrier.

2. The planetary gear-automatic transmission according to claim 1, wherein one shifting element is a first brake, and further wherein when the first brake is in a closed state, the first sun wheel is securely fixed in relation to the housing.

3. The planetary gear-automatic transmission according to claim 2, wherein a second planetary gear set comprises a second hollow wheel, which is arranged in a rotatable manner; a second sun wheel, which is arranged in a rotatable manner; and second planetary wheels, which mesh with the second hollow wheel and the second sun wheel; the second planetary wheels being mounted in a rotatable manner on a second planetary wheel carrier.

4. The planetary gear-automatic transmission according to claim 3, wherein the first and the second sun wheel are permanently coupled in rotation with each other.

5. The planetary gear-automatic transmission according to claim 4, wherein one shifting element is a second clutch, and further wherein when the second clutch is in a closed state, the transmission input element and the second planetary wheel carrier are coupled in rotation with each other.

6. The planetary gear-automatic transmission according to claim 5, wherein a third planetary gear set comprises a third hollow wheel, which is arranged in a rotatable manner; a third sun wheel, which is arranged in a rotatable manner; and third planetary wheels, which mesh with the third hollow wheel and the third sun wheel; and the third planetary wheels being mounted in a rotatable manner on a third planetary wheel carrier.

7. The planetary gear-automatic transmission according to claim 6, wherein the third hollow wheel is permanently coupled in rotation with the second hollow wheel.

8. The planetary gear-automatic transmission according to claim 7, wherein the third planetary wheel carrier is permanently coupled in rotation with the transmission output element.

9. The planetary gear-automatic transmission according to claim 8, wherein one shifting element is a third clutch, and further wherein when the third clutch is in a closed state, the third sun wheel and the transmission input element are coupled in rotation with each other.

10. The planetary gear-automatic transmission according to claim 9, wherein a fourth planetary gear set comprises a fourth hollow wheel, which is arranged in a rotatable manner; a fourth sun wheel, which is arranged in a rotatable manner; and fourth planetary wheels, which mesh with the fourth hollow wheel and the fourth sun wheel; the fourth planetary wheels being mounted in a rotatable manner on a fourth planetary wheel carrier.

11. The planetary gear-automatic transmission according to claim 10, wherein the fourth hollow wheel is permanently coupled in rotation with the third sun wheel.

12. The planetary gear-automatic transmission according to claim 11, wherein the fourth planetary wheel carrier is permanently coupled in rotation with the transmission output element.

13. The planetary gear-automatic transmission according to claim 12, wherein the fourth planetary wheel carrier is permanently coupled in rotation with the third planetary carrier.

14. The planetary gear-automatic transmission according to claim 13, wherein one shifting element is a second brake, and further wherein when the second brake is in a closed state, the fourth sun wheel is securely fixed in relation to the housing.

15. The planetary gear-automatic transmission according to claim 14, wherein one shifting element is a fourth clutch, and further wherein when the fourth clutch is in a closed state, the second planetary wheel carrier and the fourth sun wheel are coupled in rotation with each other.

16. The planetary gear-automatic transmission according to claim 15, further comprising:
an outer hollow shaft by which the first sun wheel is coupled in rotation with the second sun wheel.

17. The planetary gear-automatic transmission according to claim 16, further comprising:
an inner hollow shaft, which is arranged in the outer hollow shaft; and
wherein the second planetary wheel carrier is connected to an output side of the second clutch by way of said inner hollow shaft.

18. The planetary gear-automatic transmission according to claim 17, further comprising:
a shaft which is arranged in the inner hollow shaft; and
wherein the third sun wheel is connected to an output side of the third clutch by way of said shaft.

19. The planetary gear-automatic transmission according to claim 18, wherein the third clutch is a positive locking clutch.

20. The planetary gear-automatic transmission according to claim 19, wherein the positive locking clutch is a claw clutch.

21. The planetary gear-automatic transmission according to claim 1, wherein a positive locking shifting element operates as the first clutch.

22. A planetary gear-automatic transmission, comprising:
a planetary gear-automatic transmission having nine forward speed gears, the planetary gear-automatic transmission, comprising:
precisely one transmission input element;
precisely one transmission output element;
precisely four planetary gear sets; and
precisely six shifting elements, each shifting element being provided for shifting individual speed gears of the nine forward speed gears of the planetary gear-automatic transmission, wherein
a first planetary gear set comprises a first hollow wheel, which is securely connected to a housing of the planetary gear-automatic transmission, a first sun wheel, which is arranged in a rotatable manner, and first planetary wheels, which mesh with the first hollow wheel and the first sun wheel, the first planetary wheels being mounted in a rotatable manner on a first planetary wheel carrier;
one shifting element is a first brake, and further wherein when the first brake is in a closed state, the first sun wheel is securely fixed in relation to the housing;
a second planetary gear set comprises a second hollow wheel, which is arranged in a rotatable manner, a second sun wheel, which is arranged in a rotatable manner, and second planetary wheels, which mesh with the second hollow wheel and the second sun wheel, the second planetary wheels being mounted in a rotatable manner on a second planetary wheel carrier;
the first and the second sun wheel are permanently coupled in rotation with each other; and
one shifting element is a first clutch, and further wherein when the first clutch is in a closed state, the first planetary wheel carrier and the second planetary wheel carrier are coupled in rotation with each other.

* * * * *